[46.]
H. Beagle Jr. Adjustable Back Band Hook.
No. 119,556.            Patented Oct. 3, 1871.
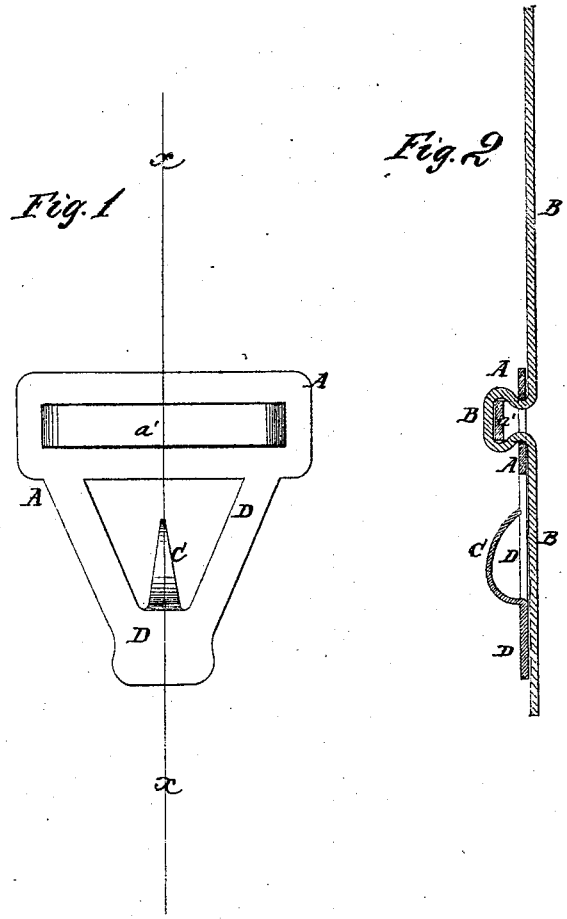
Witnesses:
A. W. Almquist
L. S. Mabee
Inventor:
H. Beagle Jr.
per Munn & Co.
Attorneys.

UNITED STATES PATENT OFFICE.

HENRY BEAGLE, JR., OF PHILADELPHIA, PENNSYLVANIA.

IMPROVEMENT IN BACK-BAND HOOKS.

Specification forming part of Letters Patent No. 119,556, dated October 3, 1871; antedated September 30, 1871.

*To all whom it may concern:*

Be it known that I, HENRY BEAGLE, Jr., of Philadelphia, in the county of Philadelphia and State of Pennsylvania, have invented a new and useful Improvement in Adjustable Back-Band Hook; and I do hereby declare that the following is a full, clear, and exact description thereof, which will enable others skilled in the art to make and use the same, reference being had to the accompanying drawing forming part of this specification, in which—

Figure 1 is a front view of my improved back-band hook detached from the back-band. Fig. 2 is a detail sectional view of the same taken through the line $x\ x$, Fig. 1, and showing it attached to the back-band.

Similar letters of reference indicate corresponding parts.

My invention has for its object to furnish an improved back-band hook which shall be simple in construction and convenient in use, being so constructed as to be easily adjusted upon the back-band and securely held in place when adjusted; and it consists in the back-band hook, constructed as hereinafter more fully described.

A is the body or plate of the hook, which has two parallel slits formed in it, dividing it into three parallel bars. The central bar $a'$ is struck up or pressed outward to project above the planes of the plate A, as shown in Figs. 1 and 2. It should be observed that the slits should be so formed that the edges of the central bar may be about upon a line with the adjacent or inner edges of the outer bars, so that the back-band B when passed through the spaces between the edges of the three bars may be bent sharply, as shown in Fig. 2, and may thus be held securely by friction. C is the hook over which the trace, tug, or chain is passed to be held. The hook C is cut out of the solid body of the part D of the plate, projecting downward from the lower edge of the lower bar of the said plate A, and is bent, struck up, or formed into proper shape to receive the trace, and, at the same time, into such a shape that its point may be about in the plane of the plate or body of the hook, so that the said point cannot catch upon the harness of the other horse or upon the reins, and so that the trace cannot become accidentally unhooked. The metal around the hook C is cut away, as shown in Fig. 1, so that the trace can be conveniently slipped over the point of the said hook C.

By this construction the hook can be conveniently adjusted or slipped up and down upon the back-band, and when adjusted will be held securely in place simply by friction.

Having thus described my invention, I claim as new and desire to secure by Letters Patent—

The double-slitted body A, having central bar $a'$ and hook C struck up therefrom, as and for the purpose specified.

HENRY BEAGLE, JR.

Witnesses:
   THOMAS S. BEAGLE,
   PETER HAY.